United States Patent [19]

Madduri

[11] Patent Number: 5,553,240
[45] Date of Patent: *Sep. 3, 1996

[54] DETERMINING A WINNER OF A RACE IN A DATA PROCESSING SYSTEM

[75] Inventor: Hari H. Madduri, Austin, Tex.

[73] Assignee: International Business Machines Corporation, Armonk, N.Y.

[*] Notice: The term of this patent shall not extend beyond the expiration date of Pat. No. 5,469,575.

[21] Appl. No.: 494,868

[22] Filed: Jun. 26, 1995

Related U.S. Application Data

[62] Division of Ser. No. 961,750, Oct. 16, 1992, Pat. No. 5,469,575.

[51] Int. Cl.$^6$ ............................................. G06F 12/14
[52] U.S. Cl. ................... 395/200.03; 395/600; 395/726; 395/200.06
[58] Field of Search .................... 395/726, 200.03, 395/200.06, 600

[56] References Cited

U.S. PATENT DOCUMENTS

| | | | |
|---|---|---|---|
| 4,224,664 | 9/1980 | Trinchieri | 395/575 |
| 4,412,285 | 10/1983 | Neches et al. | 395/650 |
| 4,542,458 | 9/1985 | Kitajima et al. | 395/425 |
| 4,574,350 | 3/1986 | Starr | 395/725 |
| 4,670,872 | 6/1987 | Cordill | 370/85.2 |
| 4,779,089 | 10/1988 | Theus | 395/325 |
| 4,818,985 | 4/1989 | Ikeda | 340/825.5 |
| 4,827,399 | 5/1989 | Shibayama | 395/600 |
| 4,858,116 | 8/1989 | Gillett, Jr. et al. | 395/325 |
| 4,937,733 | 6/1990 | Gillett, Jr. et al. | 395/325 |
| 5,129,089 | 7/1992 | Nielsen | 395/725 |
| 5,151,988 | 9/1992 | Yamagishi | 395/600 |
| 5,167,022 | 11/1992 | Bahr et al. | 395/725 |
| 5,175,852 | 12/1992 | Johnson et al. | 395/600 |
| 5,202,971 | 4/1993 | Henson et al. | 395/600 |
| 5,237,694 | 8/1993 | Horne et al. | 395/725 |
| 5,251,318 | 10/1993 | Nitta et al. | 395/725 |
| 5,265,245 | 11/1993 | Nordstroms et al. | 395/425 |
| 5,287,521 | 2/1994 | Nitta et al. | 395/725 |
| 5,297,269 | 3/1994 | Donaldson et al. | 395/725 |
| 5,339,427 | 8/1994 | Elko et al. | 395/725 |

*Primary Examiner*—Jack B. Harvey
*Assistant Examiner*—Ayaz Sheikh
*Attorney, Agent, or Firm*—Jeffrey S. LaBaw

[57] ABSTRACT

A first peer entity in a data processing system comprising a plurality of similar peer entities searches for a share control file for a system privilege. The share control file contains an address of a master entity which controls the system privilege. The plurality of entities may be either a plurality of peer processors or If the first entity does not find a share control file, it creates a share control file which contains its system and maintain an exclusive write lock on the storage control file address. Each subsequent entity competing for the system privilege will also search for the share control file. However, since the subsequent entities will find the share control file created by the first entity, these entities read the share control file for the address of the master entity. The invention may be used in a multi or single processor environment.

9 Claims, 5 Drawing Sheets

SHADOW REGISTRATION TABLE

| NO. | MACHINE ID | PROCESS ID | PORT NO. | PROTOCOL ID | R/W |
|---|---|---|---|---|---|
| 1 | 129.45.26.123 | 1926 | 1041 | 2 | R |
| 2 | 134.67.23.124 | 1892 | 1044 | 1 | W |
| 3 | 125.12.35.234 | 6920 | 1092 | 2 | W |
| 4 | 133.47.24.189 | 1972 | 1021 | 1 | R |

DETERMINING A WINNER OF A RACE IN A DATA PROCESSING SYSTEM

This application is a divisional of Ser. No. 07/961,750, filed Oct. 16, 1992, which is now U.S. Pat. No. 5,469,575.

BACKGROUND OF THE INVENTION

This invention generally relates to determining which of a plurality of peer entities in a data processing system has access to a common resource. More particularly it relates to determining the winner of a race to a system privilege in a distributed system.

There are many prior art techniques for determining which of a plurality of processors or associated processes is allowed access to and/or controls a particular common resource or a system process in a data processing system. The data processing system may be a standalone system or may comprise several separate data processing systems coupled together by a network to form a distributed data processing system. Many of these prior art techniques rely on establishing the relative priority of the contending processors or processes, for example, allowing a higher priority processor to override a lower priority processor. In other prior art, messages pass a token through the network, whichever system holds the token is allowed access to and control of the network or the resource.

The present invention proposes that a simpler and more equitable rule would be to allow the first peer processor or peer process to attempt access to the resource to become the resource master. In a distributed system where the processors and processes are essentially identical, it would appear to be no overriding reason to give a particular processor or process higher priority over any of its identical peers.

However, in a distributed system, events happen in a truly concurrent manner. It is very difficult to know which processor or process was the first to attempt access to a common resource or perform a given action. There is no unique reference point from which the distributed system can reliably establish the first processor.

In a single processor system where all processes can be timed stamped by the internal clock and there is a shared memory, it is relatively easy to establish the first process to attempt a given action. However, in a distributed system, the internal clocks may vary by several, seconds, being set by an individual user or system administrator. Even if the clocks are set correctly at the beginning, the clocks still drift as time progresses. The determination of which peer was first is dependent upon millisecond precision; the use of internal clocks is not adequate.

Often distributed programs rely on having a master or coordinator process and several secondary or shadow processes. Although the processes are essentially identical, one of them is chosen as master and the rest are asked to play the secondary shadow roles. A process which is just coming up must know whether it is the master process or a secondary shadow. Since in a distributed system a process cannot look at the other systems' memories, it is not possible to know whether this new process is the master. A name service might be used to locate a master process, however, unless the name service allows atomic registration of master processes, it becomes possible for multiple processes to register as master at the same time.

The present invention provides a solution to the problem of determining which processor or process is first to attempt to gain control of a common resource or privilege, particularly in a distributed system.

SUMMARY OF THE INVENTION

Therefore, it is an object of the invention to determine the winner of a race among a plurality of peer entities in a distributed data process system.

It is another object of the invention to allow the winner control of a common resource in a distributed data processing system.

It is another object of the invention to provide a referent for a plurality of peers to establish which performed a given action first.

It is another object of the invention to notify a losing peer the identity of the winning processor or process.

These and other objects of the invention are accomplished by requiring the first entity of a plurality of contending peer entities which wants to control access to the common resource or become the master of a system process to create a share control file. The entities are peer processors or processes in the system. Each subsequent processor or process which requires access to the resource or system process reads the share control file to find the network address of the first, owning processor or process to negotiate access to the resource or system process.

According to the method of the invention, a first entity in a system comprising a plurality of processors and/or processes searches for a share control file for the resource in a memory or in a previously agreed upon place. For example, this could be a particular named file in a particular directory in a common file system. The share control file contains an address of a controlling processor or process which controls access to the resource or system process. Since the first processor or process does not find a share control file, it creates a share control file for the resource in the memory which contains an address of the first processor or process. The first processor or process then maintains an exclusive write lock on the resource and the share control file also preferably a shared read lock. After the first processor or process attempts to create the share control file, it will preferably conduct a test to determine whether another processor created a share control file first, between the first processor's search and create steps. The processor or process succeeds only if no one else created it in between the two steps. For each subsequent processor or process, the procedure for determining whether it has won the race for access to the common resource or system process, comprises a similar first step of searching for the share control file in the memory. However, since the second processor or process will find the share control file written by the first processor or process, the second processor will read the share control file for the address of the master processor or process to negotiate access.

While the invention has particular application to an environment in which there is no single referent to determine which processor has won a race for the common resource, it is also possible to use the invention for a plurality of processes resident on a single processor. In this case, it is the first application which determines whether it has won the race for access to a common resource by searching for a share control file for the resource. If it does not find a share control file, it creates a share control file for the resource, the share control file containing an address of the first application. Each subsequent application upon searching for and finding the share control file in the memory, will read the share control file for the address of the controlling application.

BRIEF DESCRIPTION OF THE DRAWINGS

These and other features of the present invention will become more readily understood with reference to the attached drawings and following description.

DETAILED DESCRIPTION OF THE DRAWINGS

The invention may be run on a variety of computers or collection of computers under a number of different operating systems. The computer could be for example, the personal computer, a mini computer or mainframe computer. Preferably, however, a plurality of computers which are part of a network such as a Local Area Network or Wide Area Network or larger teleprocessing system are used. Although the specific choice of computer is limited only by disk and disk storage requirements, computers in the IBM PS/2™ series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference Manual Personal Systems/2 (Model 80) IBM Corporation* Part No. 68X2256 Order Number S68X-2254. One operating system which an IBM PS/2 personal computer may run is IBM's OS/2 2.0™ for more information on the IBM OS/2 2.0 Operating System the reader is referred to OS/2 2.0 *Technical Library, Programming Guide Vol.* 1, 2, 3, *Version* 2.00 order nos. 10G6261, 10G6495, 10G6494.

In the alternative, the computer systems might be in the IBM RISC System/6000 ™ line of computers which run on the AIX™ operating system. The various models of the RISC System/6000 is described in many publications of the IBM Corporation for example, *RISC System/6000, 7073 and 7016 POWERstation and POWERserver Hardware Technical* reference, Order No. SA23-2644-00.

The AIX operating system is described in *General Concepts and Procedure—AIX Version 3 for RISC System/6000* Order No. SC23-2202-00 as well as other publications of the IBM Corporation.

Figure 1:
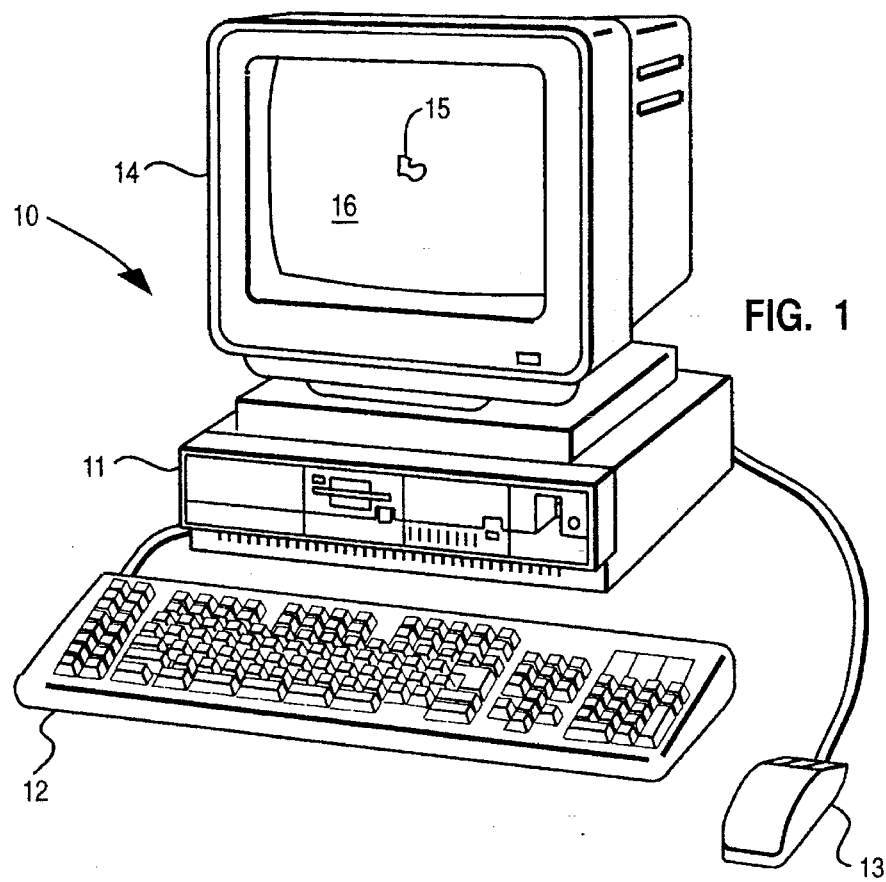
FIG. 1 shows a computer comprising system unit keyboard, mouse and display.

In FIG. 1, a computer 10, possibly a multimedia computer comprising a system unit 11, a keyboard 12, a mouse 13 and a display 14 are depicted. The screen 16 of display device 14 is used to present the visual changes to the data object. The graphical user interface supported by the operating system allows the user to use a point and shoot method of input by moving the pointer to an icon representing a data object at a particular location on the screen 16 and press one of the mouse buttons to perform a user common selection. The data object selected will appear on a window which may present any number of selected views of the object.

Figure 2:
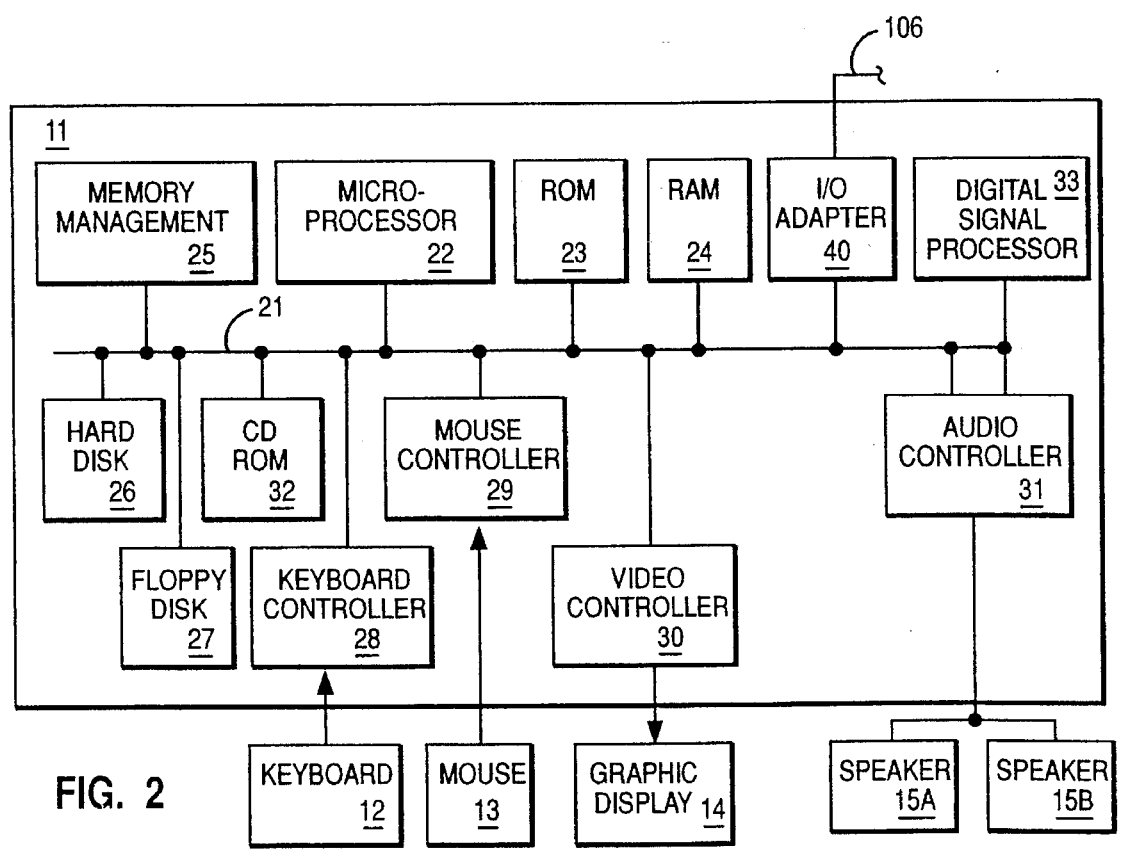
FIG. 2 is a block diagram of the components of the computer shown in FIG. 1.

FIG. 2 shows a block diagram of the components of the multimedia personal computer shown in FIG. 1. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM multimedia PS/2 series of computers is one of the Intel family of microprocessors including the 386 or 486 microprocessors. However, other microprocessors included, but not limited to Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 23 contains among other code the Basic Input/Output System (BIOS) which controls basic hardware operations such as the interaction and the disk drives and the keyboard. The RAM 24 is the main memory into which the operating system and multimedia application programs are loaded. The memory management chip 25 is connected to the system bus 21 and controls direct memory access operations including, passing data between the RAM 24 and hard disk drive 26 and floppy disk drive 27. A CD ROM 32 also coupled to the system bus 21 is used to store the large amount of data present in a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15a and 15b. Also coupled to the system bus 21 is digital signal processor 33 which corrects the sound produced by the speaker system and is preferably incorporated into the audio controller 31. The speakers 15a and 15b may be used to present audio objects to the user. An I/O controller 40 such as a Token Ring Adapter enables communication over a network 106 to other similarly configured data processing systems.

Figure 3:
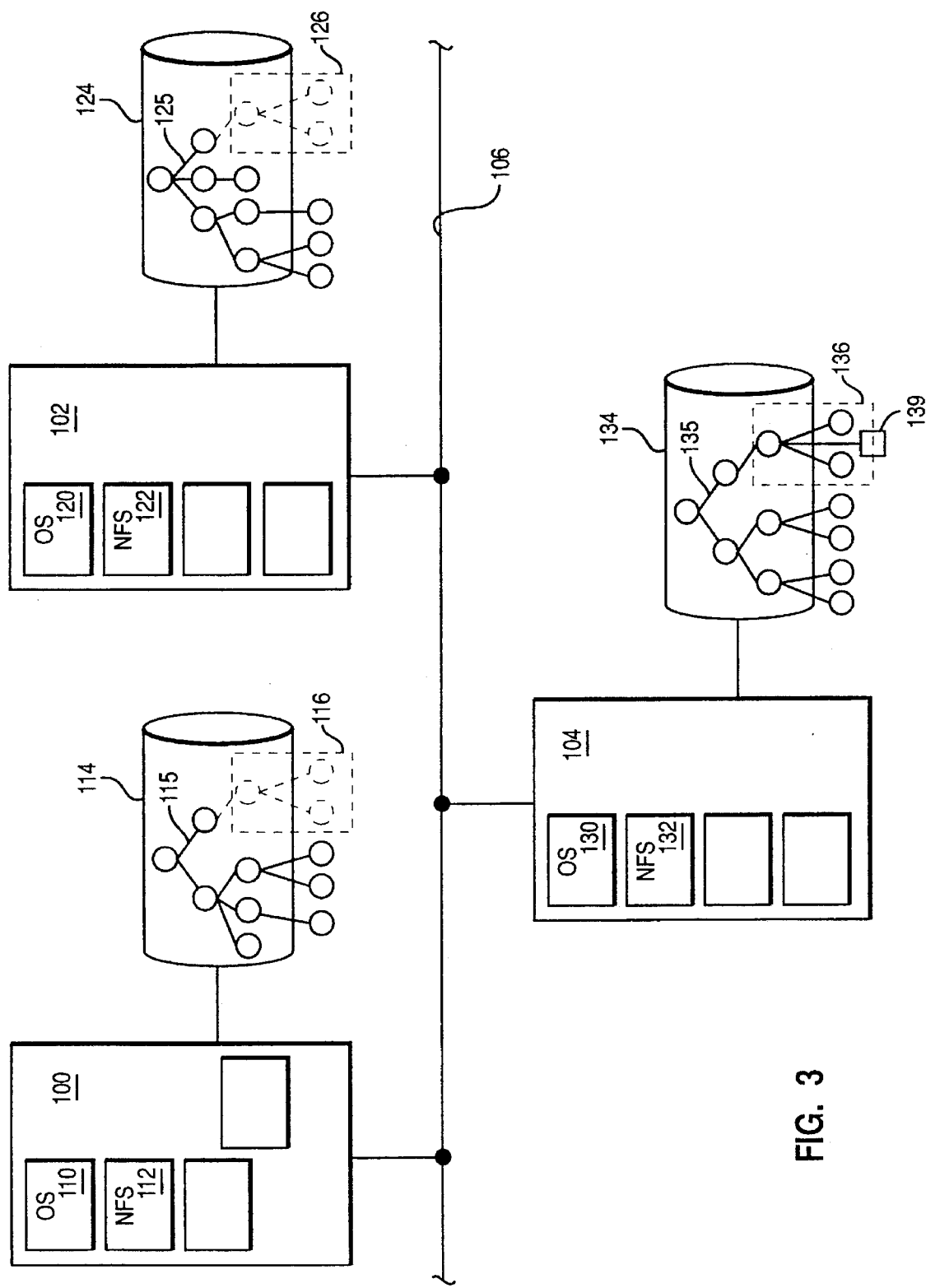
FIG. 3 shows a distributed environment in which the invention may be implemented.

FIG. 3 depicts a distributed environment in which the invention finds particular application. A plurality of processors similar to that described above are coupled to a network 106. The processors 100, 102, 104 contain an operating system and a network file system in their random access memory and their disk storage. For example, in the first processor 100 operating system 110 and network file system 112 are resident in memory which is coupled to disk storage 114 containing file system 115. The second processor 102 runs the operating system 120 and the network file system 122 in which is coupled to the disk storage 124 containing file system 125. A third processor 104 contains operating system 130 and network file system 132 and is coupled through disk storage 134 containing file system 135.

The file systems 115, 125, 135 are arranged in a hierarchial structure which resembles the form of an inverted tree. The file tree use directions to organize data and programs into group allowing the file system to manage several directions and files at one time. When the file systems are being constructed using the network file system, it is possible for one processor, for example, the third processor 104, to notify the other processors on the network that it has a particular subtree 136, which is available for incorporation or mounting into their file system. As shown, file system 115 and 125 have incorporated the subtree 136 of file system 135 into their tree structure. When a process wants to access files in file system 115 indicated by the dotted box portion 116, processor 100 sends a request to the third processor 104 for the subtree 136. Thus, all three processors 100, 102, 104 contend for the shared resource of the subtree 136 contained in tree 135 and disk storage 134 of the third processor 104. This subtree would be an ideal place to store the share control file 139 since it is accessible to all processors. It will help determine the winner of a race among the three processors and the processes on them.

In such a distributed environment, the operating system creates the illusion of having one file system in a single logical volume regardless of the actual physical location of the individual files. The part of trees exported by one system are made available to other systems to be mounted on their local trees.

The network file system is described in the Network File System (NFS) Overview for System Management in *Communication Concepts and Procedures,* Order No. SC23-2203-00 a publication of the IBM Corporation.

The share control file in the present invention can be compared to a system semaphore. A semaphore is anything, e.g., a signal, a flag, an indicator that is used in computer systems to prevent two processes or processors coming in each other's way. For example, if two processors are trying to print to the same printer, the system must make sure that they do so one after the other, not intermixed. This problem is solved by requiring that each processor set a semaphore before it starts printing and reset the same semaphore after it finishes printing. The setting of the semaphore lets the other processor know that it has to wait until the semaphore has been reset. A semaphore can be implemented in many ways. Typically, computer systems have a test-and-set computer instruction that sets a memory location to a specified value if it is not already set. In a distributed system, it is more difficult, in that there is no common memory among processors. There are shared memory multiprocessors that can and do use such semaphores. Although the present invention could be used in a share memory system, the use of a test and set semaphore would probably be more efficient. The share control file, is mechanism by which the present invention allows distributed systems with no shared memory to determine the race for a common resource or other system privilege.

According to the present invention, the process contending to be the master processor are designed to look for a share control file. If the share control file is not found, the first process to create the file and place it in an exclusive write mode wins the race and becomes the master. The following description will describe the method of the invention in terms of competing processes to be the master process. The invention is equally useful in a system of competing processors to be the master processor of a common resource or system process.

Figure 4:
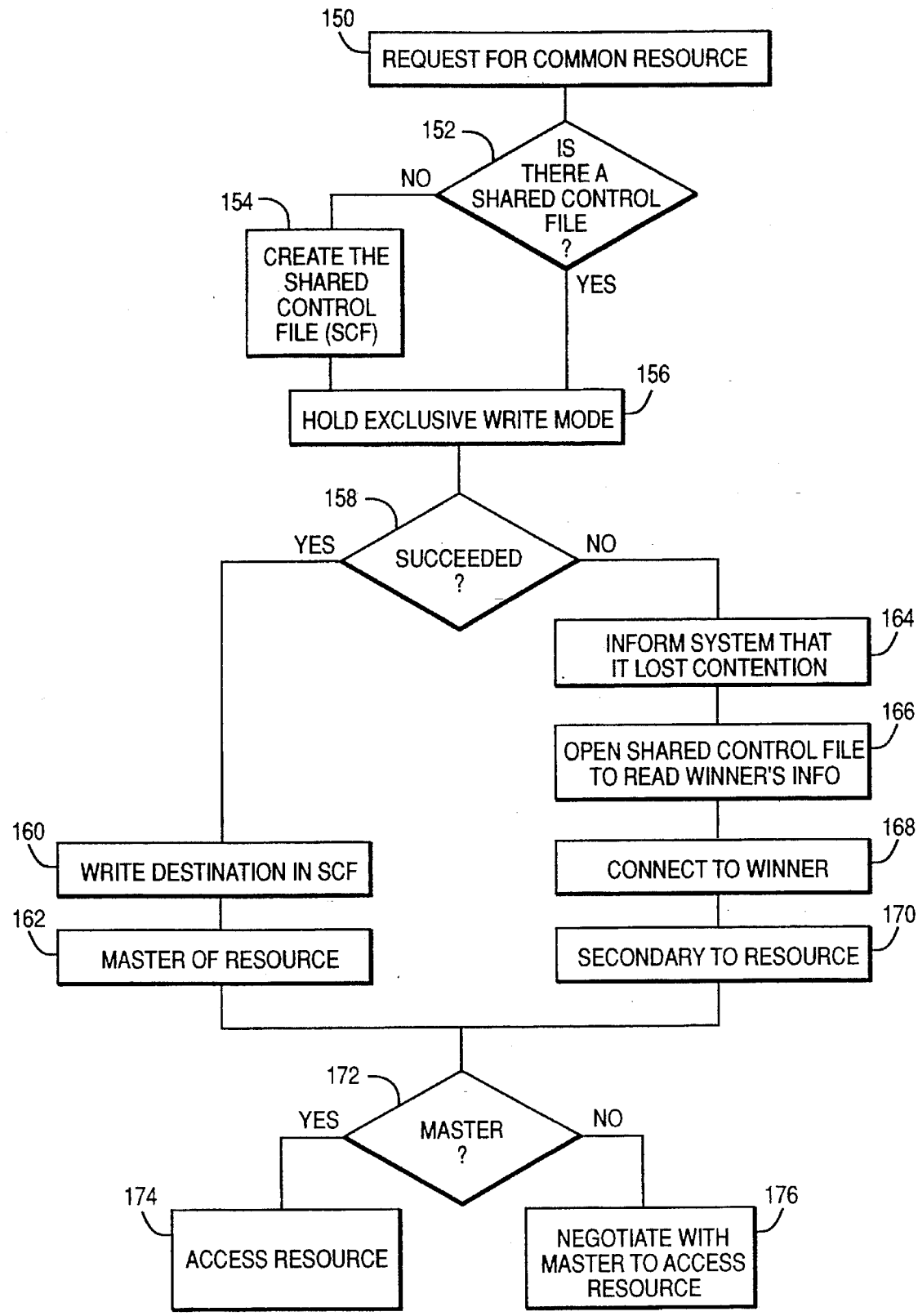
FIG. 4 is a flow diagram of the process to determine the winner of a race for a common resource or system process.

FIG. 4 is the flow diagram to determine the winner of the race for a common resource or system process. The procedure begins in step 150 where one processes makes a request for a common resource. The processes has been designed to search for a share control file (SCF), step 152. If there is no share control file the process assumes that it is the winner of the race and begins to create a share control file, step 154. Next, it holds an exclusive write mode on the resource and the SCF, step 156 and may also, depending on the operating system, hold them in a shared read mode. The exclusive lock on the resource is not usually needed since every process should know that it has to first get exclusive access to the share control file. It may be an issue if the system cannot trust poorly behaving processes to follow the procedure of first getting a lock on the share control file. Next, a test is performed to determine whether the process succeeded in creating the SCF and placing it in the exclusive write mode, step 158. The process may not succeed if another process was successful in creating a share control file after the initial search for share control file in step 152 was unsuccessful, but before the process completed creating its on SCF. If it did succeed, the process will write its destination in the share control file, step 160 and knows that it is the master of the resource, step 162.

After failing to obtain an exclusive write access to the share control file in test 158, the process is informed that it lost the race for the common access in step 164. A message could be passed at this point, however, the processes in the preferred embodiment are designed such that finding the SCF is notice that they lost contention. Next, the share control file is opened to read the winner's information such as the winners destination, his communication port, machine id, protocol with which he communicates and so forth. If the losing process needs access to the common resource will connect to the winner, step 168, to negotiate access. It will know that it is a secondary or shadow process with respect to this particular common resource, step 170. For future access, the process will know whether it is a master or shadow for the resource. In step 172, a decision is made whether it is allowed to access the resource directly 174 or must negotiate with the master for the resource in step 176.

Figure 5A:
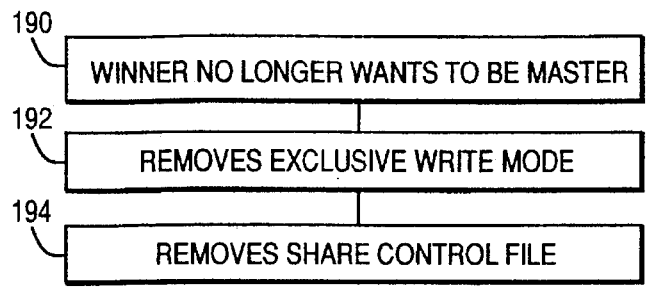
FIG. 5a depicts the process to release control of the common resource.
Figure 5B:
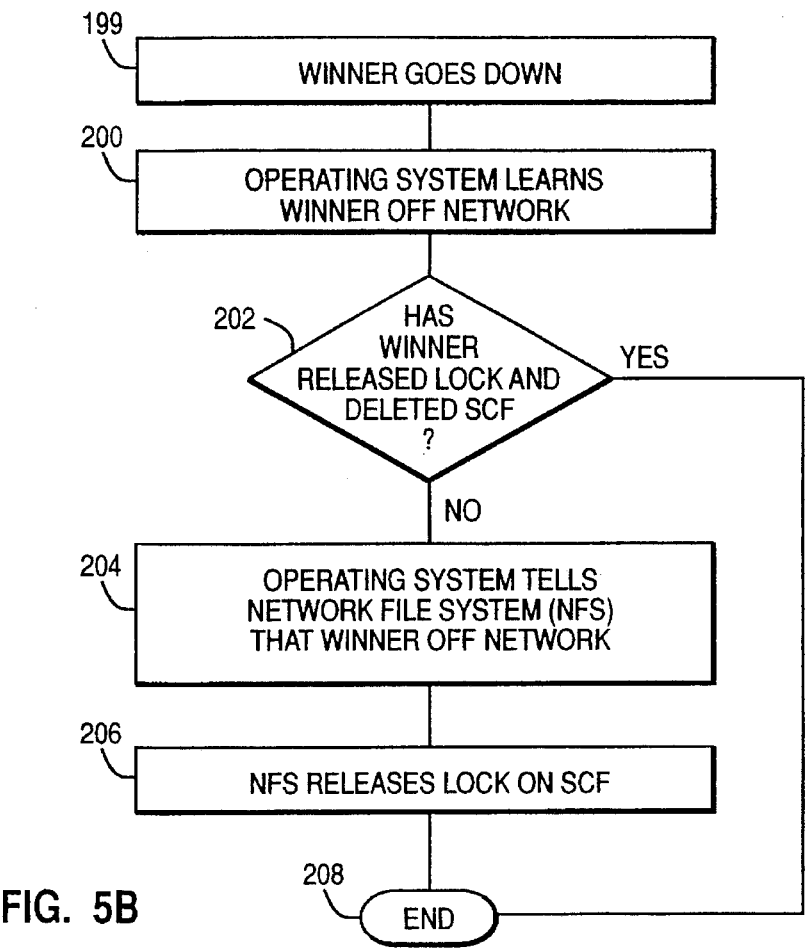
FIG. 5b is a flow diagram of a process to release the common resource if the master wants to relinquish control on the common resource or the master terminates.

The process by which a master can release of the common resource is relatively simple. In FIG. 5a, the winner makes the determination that it no longer wants to be master of the resource, step 190. It removes the exclusive write lock on the resource in step 192 and removes the share control file in step 194. Now, the next system to request access to the common resource will go through the contention process illustrated in FIG. 4 to become the new master.

It is also possible that the winner could experience an unplanned calamity and go down, step 199, such as a process failure due to program error. One of the many tasks which the operating system performs is to keep track of what systems and processes are currently running on the computer. Once the winner goes down, the operating system learns of this in step 200. The operating system determines whether the winner's shutdown has been controlled, i.e., that it has released the lock and deleted the share control file, step 202, or uncontrolled. If the winner or master has not had the opportunity to release the exclusive write lock and delete the SCF, the operating system tells the network file system that the master is off the network, step 204. The network file system then releases the lock on the SCF, step 206. The process ends step 208, allowing the shadow processes to vie for the right to be the new master, see FIG. 4.

Figure 6:
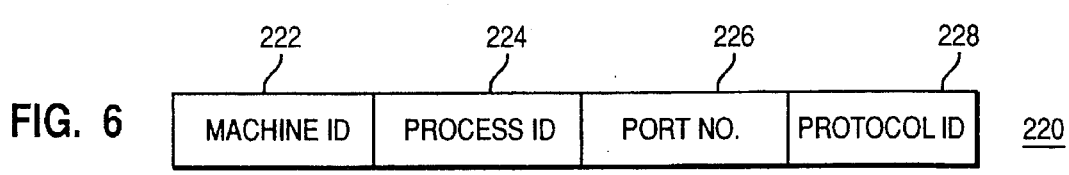
FIG. 6 is a flow diagram of the registration procedure which a shadow goes through with the master after losing the race.

FIG. 6a depicts a share control file 220. The share control file 220 contains fields for the machine id 222, the process id 224, the port number 226, and the protocol id 228. The machine id, for example, might be the master processor internet machine number, e.g., 129.45.26.243. Or it could be an alphanumeric string. The process id is typical a number identifying the winning processes. The port number 226 is also typically an integer indicating where the master's processor is coupled to the network. Finally, the protocol id 228 represents what communication protocol the master's system uses to communicate with others. For example, it could be TCP/IP protocol. On IBM's AIX operating system, TCP/IP has an id number of 2.

Figures 7, 8:
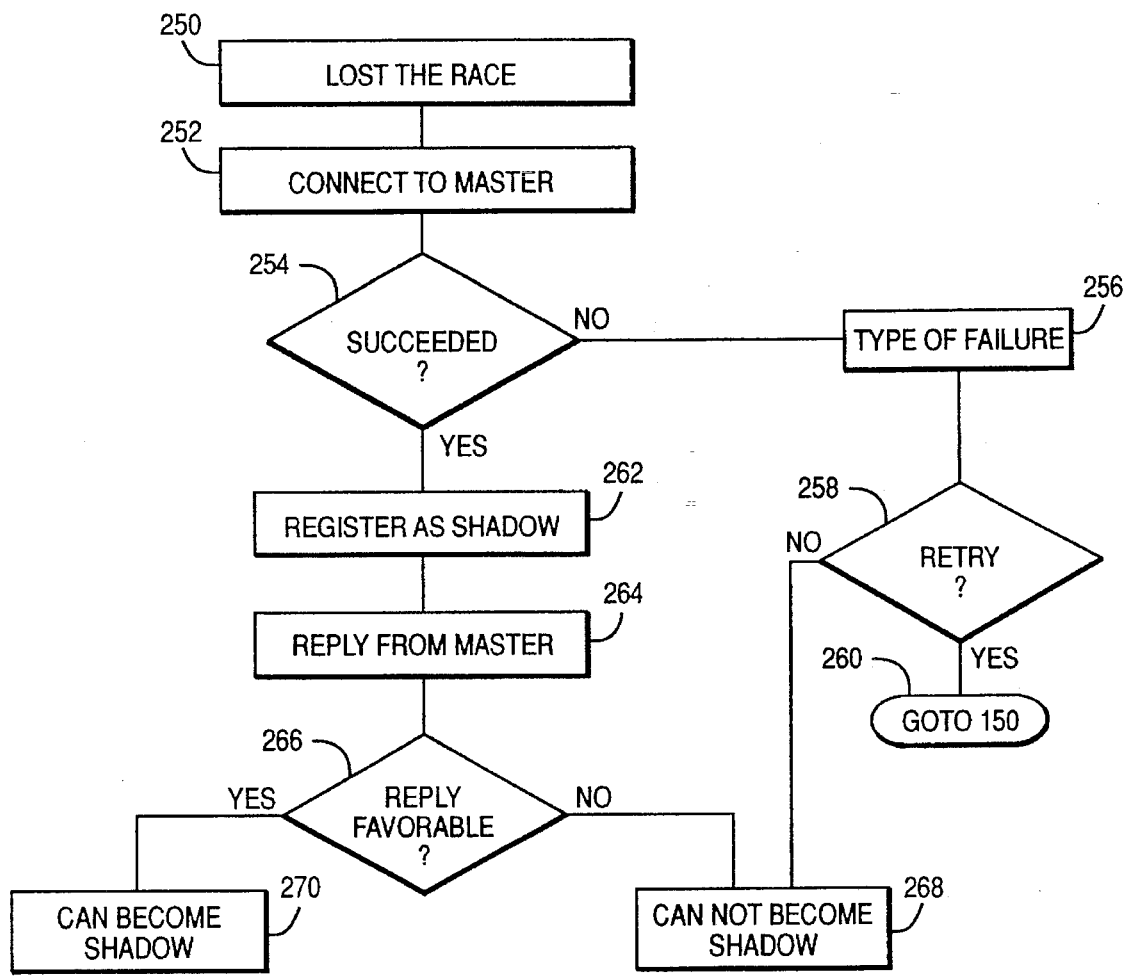
FIG. 7 depicts a share control file.
FIG. 8 depicts a table of registered shadows with a master replica.

FIG. 7 depicts the procedure the shadow goes through after it determines that it has lost the race for the common resource or system process. The flow diagram begins in step 250 with a determination that the process has lost the race. Using the information read from the SCF the process attempts to make the connection to the master process, step 252. Next, the decision is made whether the shadow process has succeeded making the connection to the master in step 254. If it does not succeed, the shadow process analyzes the type of failure which was experienced and decides whether to retry becoming the master. The retry decision in step 258 determines whether the shadow process returns to step 150 in FIG. 4.

If the process has succeeded in connecting to the master process, a message is sent to register as a shadow process with the master, step 262. The shadow waits and receives a reply from the master in step 264. The shadow determines whether the master's reply is favorable, step 266. If not, the process cannot become a shadow to the master, step 268. It presents this information to the user on a system display and waits for further instructions. If the reply from the master is favorable, the shadow process can access the common resource or system process as a shadow and sends the master registration information which the master uses to build a table of shadows.

The shadow registration table is depicted in FIG. 8. The information contained in the table is similar to that contained in the SCF with some additional information. In addition to the machine id, process id, port number and protocol id in the SCF, the master preferably registers the shadows in the order in which they connect to the master. The shadow registration table then becomes a waiting list so that the first losing process is first in line for the common resource if the master is not using it, the second losing process is second in line and so forth. The shadow registration table may also contain information concerning whether the process wishes to read or write to the common resource and other optional information such as what type of update messages it is interested in receiving from the other processes. The shadow priority can be used as an alternative means of determining the new master if the existing master goes down or relinquishes it master status. The first shadow can then become the next master without going through the contention procedure in FIG. 4

While the invention has been described above as a race to control access to a particular common resource or system process, the invention may be used in any situation where multiple peers any of which could function equally well as a master, but because of system constraints only one of which may become the master. The master may have a particular role in the system such as having the authority to tell its peers to perform certain system functions, answer questions about a common resource, or any sort of system privilege that the other peer processors and processes are not allowed to perform. For example, in a multi-processor system one channel exists for the incoming mail, any of the processors are equally capable to route mail through the system. However, only one should perform that function, the master processor. Alternatively, after winning contention, the master processor may coordinate the mail routing procedure with the shadow processors.

One example of a system privilege is the ability to update a replicated data object which is resident on a plurality of system processors. A write lock is held by the processor with the master replica. The system with the master replica may require that all systems within shadow replicas send it any updates which it will apply to the master copy first and then propagate. An alternative arrangement is described in commonly assigned, copending application, Ser. No. 07/961,757 which is now U.S. Pat. No. 5,418,966, entitled "Moving Write Lock For Updating Replicated In-Memory Objects" to Hari Madduri, filed, Oct. 16, 1992 and hereby incorporated by reference. The master replica owns and tracks the holder of the write lock, but allows the shadow replicas to request the write lock to perform local updates.

While the invention has been described with respective to particular embodiments above, it would be understood by those skilled in the art that modifications may be made without departing from the skill and scope of the present invention. These embodiments are for purposes of example and illustration only and are not to be taken to limit the scope of the invention narrower than the scope of the appended claims.

I claim:

1. A computer program product on a computer memory readable by a computer system having a plurality of peers, a system determining whether a the product peer has won a race for a system privilege comprising:

program code means for searching for a share control file in a predetermined location in the system, the share control file containing an address of a master peer which has the system privilege;

program code means responsive to the absence of the share control file for creating a share control file in the predetermined location, the share control file containing an address of the peer to become the master peer;

program means for placing an exclusive write lock on the share control file; and, program code means for maintaining the exclusive write lock on the share control file.

2. The product as recited in claim 1 which further comprises:

program code means responsive to finding the share control file, for reading the share control file for the address of the master peer.

3. The product as recited in claim 2 wherein the system privilege is to control access to a common resource.

4. The product as recited in claim 2 wherein the system privilege is to perform a system process.

5. The product as recited in claim 2 wherein the predetermined location is a common file system coupled to the processors.

6. The method as recited in claim 2 wherein the plurality of peers is a plurality of system processors.

7. The method as recited in claim 2 wherein the plurality of peers is a plurality of peer applications.

8. The method as recited in claim 2 wherein the plurality of peers is a replicated data object comprising a master replica and a plurality of shadow replicas.

9. The product as recited in claim 2 which further comprises:

program code means for registering a set of the plurality of peers with the master peer as shadow peers, the shadow peers having priority in the order in which they were registered with the master peer.

\* \* \* \* \*